(12) United States Patent
Hayashi

(10) Patent No.: US 8,146,339 B2
(45) Date of Patent: Apr. 3, 2012

(54) STEEL CORD FOR REINFORCING RUBBER ARTICLE AND PNEUMATIC RADIAL TIRE

(75) Inventor: Shoji Hayashi, Nasushiobara (JP)

(73) Assignee: Bridgestone Corporation, Tokyo (JP)

( * ) Notice: Subject to any disclaimer, the term of this patent is extended or adjusted under 35 U.S.C. 154(b) by 954 days.

(21) Appl. No.: 12/092,198

(22) PCT Filed: Oct. 30, 2006

(86) PCT No.: PCT/JP2006/321652
§ 371 (c)(1),
(2), (4) Date: Jun. 23, 2008

(87) PCT Pub. No.: WO2007/052603
PCT Pub. Date: May 10, 2007

(65) Prior Publication Data
US 2009/0283193 A1    Nov. 19, 2009

(30) Foreign Application Priority Data

Oct. 31, 2005  (JP) .................................. 2005-315811
Dec. 14, 2005  (JP) .................................. 2005-359704

(51) Int. Cl.
*D02G 3/02* (2006.01)
*D02G 3/48* (2006.01)
(52) U.S. Cl. ....................................................... 57/236
(58) Field of Classification Search ............... 57/212, 57/232, 236, 241
See application file for complete search history.

(56) References Cited

U.S. PATENT DOCUMENTS

| | | | | |
|---|---|---|---|---|
| 5,737,909 | A * | 4/1998 | Macklin et al. | 57/218 |
| 6,365,273 | B1 * | 4/2002 | Baillievier | 428/379 |
| 2005/0133140 | A1 * | 6/2005 | Lee et al. | 152/556 |

FOREIGN PATENT DOCUMENTS

| | | |
|---|---|---|
| EP | 0 985 760 A2 | 3/2000 |
| JP | 59-038102 A | 3/1984 |
| JP | 60-185602 A | 9/1985 |
| JP | 64-085381 A | 3/1989 |
| JP | 64-085382 A | 3/1989 |
| JP | 64-085383 A | 3/1989 |
| JP | 64-085384 A | 3/1989 |
| JP | 01-141103 A | 6/1989 |

(Continued)

OTHER PUBLICATIONS

Anonymous; "High Tensile Strength Steel Cord Constructions for Tyres," Research Disclosure, Aug. 1, 1992, Mason Publications, Hampshire GB, XP007118007 ISSN: 0374-4353, 20 pages.

(Continued)

*Primary Examiner* — Shaun R Hurley
(74) *Attorney, Agent, or Firm* — Sughrue Mion, PLLC

(57) ABSTRACT

A steel cord for reinforcing rubber article having a 1×n structure composed of a plurality of steel filaments stranded in the same direction at the same stranding pitch, the number of the steel filaments being 6 to 12 and the diameter of the steel filaments being 0.08 to 0.21 mm. In the pneumatic radial tire having a carcass, as a framework, extending toroidally between a pair of bead parts, with a crown part of the carcass being reinforced with a belt layer, the above-described steel cord for reinforcing rubber article is applied to a cord constituting the belt layer.

15 Claims, 3 Drawing Sheets

FOREIGN PATENT DOCUMENTS

| | | |
|---|---|---|
| JP | 03-074206 A | 3/1991 |
| JP | 03-143703 A | 6/1991 |
| JP | 05-302283 A | 11/1993 |
| JP | 06-010281 A | 1/1994 |
| JP | 06-073673 A | 3/1994 |
| JP | 07-279067 A | 10/1995 |
| JP | 07-331587 A | 12/1995 |
| JP | 08-092884 A | 4/1996 |
| JP | 8-113886 A | 5/1996 |
| JP | 9-209283 A | 8/1997 |
| JP | 9-268485 A | 10/1997 |
| JP | 09-279492 A | 10/1997 |
| JP | 9-279493 A | 10/1997 |
| JP | 10-250310 A | 9/1998 |
| JP | 10-292277 A | 11/1998 |
| JP | 10-298880 A | 11/1998 |
| JP | 11-323748 A | 11/1999 |
| JP | 11-335985 A | 12/1999 |
| JP | 11-350367 A | 12/1999 |
| JP | 2003-63209 A | 3/2003 |

OTHER PUBLICATIONS

Supplementary European Search Report issued in European Patent Application No. 06 81 2162, dated Jan. 5, 2010 (1 page).

English language translation of JP 11-323748, Nov. 26, 1999, Tokyo Seiko Co., Ltd.

* cited by examiner

STEEL CORD FOR REINFORCING RUBBER ARTICLE AND PNEUMATIC RADIAL TIRE

CROSS REFERENCE TO RELATED APPLICATIONS

This application is a National Stage of International Application No. PCT/JP2006/321652 filed on Oct. 30, 2006, claiming priority based on Japanese Patent Application Nos. 2005-315811, filed Oct. 31, 2005, and 2005-359704, filed Dec. 14, 2005, the contents of all of which are incorporated herein by reference in their entirety.

TECHNICAL FIELD

The present invention relates to a steel cord for reinforcing rubber article, and a pneumatic radial tire (hereinafter, these may be also simply referred to as "cord" and "tire", respectively). More specifically, the present invention pertains to a steel cord for reinforcing rubber article suitably used for the reinforcement of a rubber article such as a pneumatic radial tire, and to a pneumatic radial tire using the same. The present invention also concerns a pneumatic radial tire having superior steering stability, used for a high performance passenger car or the like.

BACKGROUND ART

In general, the pneumatic radial tire has a carcass, as a framework, extending toroidally between a pair of bead parts, and on the outside in the radial direction of the tire, there is provided a belt layer comprising a rubberized steel cord, as a reinforcing layer. In the pneumatic radial tire as a typical example of rubber article using a steel cord as a reinforcing material, from the viewpoint of improving steering stability and durability, a steel cord that is high in flexibility and superior in durability is demanded as a reinforcing material for the belt layer, and various studies thereof have been hitherto conducted. In particular, important properties necessary for the belt layer to ensure steering stability for a high performance radial tire, are high tensile rigidity in the circumferential direction, high in-plane flexural rigidity, and low out-of-plane flexural rigidity.

That is, the belt member must have high rigidity in the circumferential direction in order to bear a tension by an internal pressure to thereby exert a hoop effect. To this end, firstly, the belt layer preferably has high tensile rigidity in the circumferential direction. Also, since the belt member is subjected to an in-plane bending deformation during cornering, the tire that is smaller in the in-plane bending deformation in the belt creates a larger cornering force, thereby allowing better steering stability to be exercised. Therefore, secondly, the belt layer preferably has high in-plane flexural rigidity.

Furthermore, in the vicinity of cornering limit, the belt layer undergoes a large bending deformation in the in-plane direction. Due to this deformation, inside the bending deformation, the belt layer is subjected to a large compressive deformation, to thereby cause buckling. However, by reducing out-of-plane flexural rigidity of the belt layer, an out-of-plane deformation pressure accompanied with the compression decreases, thereby enabling buckling deformation to be inhibited by the internal pressure of the tire. As a result, a release of a ground contact pressure is suppressed, resulting in a uniform contact pressure. Therefore, thirdly, the belt layer preferably has low out-of-plane flexural rigidity.

In order to reduce the out-of-plane flexural rigidity of the belt layer to thereby improve the steering stability, there are known techniques for applying a steel cord that is small in the diameter of filaments and low in flexural rigidity to the belt. For example, the Patent Document 1 sets forth a technique for improving steering property, stability and the like during cornering by using a specific steel cord composed of filaments with a small diameter (filament diameter: 0.06 to 0.10 mm). The Patent Document 2 discloses a tire of which the steel cord is defined by bending resistance and tensile elongation. The Patent Document 3 discloses a tire having a steel code which is composed of predetermined steel filaments and in which the range of values defined by belt flexural rigidity, cord tenacity, and the void amount in a belt cord is defined to be a predetermined range. The Patent Documents 4 to 6 each disclose a steel cord for tire reinforcement which has a predetermined filament structure and in which the range of values defined by cord tenacity, cord elongation at break, and cord flexural rigidity, is regulated to a predetermined range. Each of these techniques in the Patent Documents 1 to 6 is one that applies a multi-stranded cord using extra-fine steel filaments to the belt layer.

Furthermore, Patent Document 7 discloses a tire (using a steel cord having a 1×n structure composed of 4 or less steel filaments, with the filament diameter being not more than 0.22 mm) wherein the belt is defined by the stranding structure of a belt cord, the filament diameter, and the number of embedded belt cords. Patent Document 8 discloses a tire (using a steel cord having a 1×n structure (n=2 to 5), with the filament diameter being 0.12 to 0.22 mm) that satisfies predetermined requirements of the stranding structure, the flexural rigidity/code tenacity ratio, the code tenacity, and the filament diameter. Patent Document 9 discloses a tire (using a steel cord having a 1×n structure composed of 5 or less steel filaments, with the filament diameter being 0.10 to 0.22 mm) wherein the belt ply of which the belt cord structure and the number of embedded belt cords are defined to be a predetermined ones is arranged via shock-absorbing rubber. Each of these techniques in the Patent Documents 7 to 9 is one which applies a 1×n steel cord using five or less small-diameter steel filaments to the belt layer.

Moreover, steel cords each having a 1×n structure composed of six or more steel filaments stranded in the same direction at the same stranding pitch, are disclosed in Patent Documents 10, 11, and the like.

[Patent Document 1]: Japanese Unexamined Patent Application Publication No. 59-38102 (Claims and others)
[Patent Document 2]: Japanese Unexamined Patent Application Publication No. 60-185602 (Claims and others)
[Patent Document 3]: Japanese Unexamined Patent Application Publication No. 64-85381 (Claims and others)
[Patent Document 4]: Japanese Unexamined Patent Application Publication No. 64-85382 (Claims and others)
[Patent Document 5]: Japanese Unexamined Patent Application Publication No. 64-85383 (Claims and others)
[Patent Document 6]: Japanese Unexamined Patent Application Publication No. 64-85384 (Claims and others)
[Patent Document 7]: Japanese Unexamined Patent Application Publication No. 1-141103 (Claims and others)
[Patent Document 8]: Japanese Unexamined Patent Application Publication No. 3-74206 (Claims and others)
[Patent Document 9]: Japanese Unexamined Patent Application Publication No. 3-143703 (Claims and others)
[Patent Document 10]: Japanese Unexamined Patent Application Publication No. 9-279492 (Claims and others)
[Patent Document 11]: Japanese Unexamined Patent Application Publication No. 9-279493 (Claims and others)

DISCLOSURE OF INVENTION

Problems to be Solved by the Invention

As described above, for the purpose of improving steering stability and riding comfort, techniques for applying a steel cord superior in flexibility and durability to the belt layer of a tire have been variously studied, and these techniques have been proposed.

However, as set forth in each of the above-described Patent Documents 1 to 6, in the technique for improving steering stability by the application of the multi-stranded steel cord using fine filaments, filaments of the steel cord are extra-fine and in addition they are multi-stranded, so that such a steel cord has some problems such as low productivity, high cost, low rubber penetration property to a single stranded cord commonly used as a belt cord, and low corrosion fatigue resistance. In particular, the techniques set forth in each of the Patent Document 4 to 6 have attempted to improve on rubber penetration property by improving the strand structure, but it has been difficult to obtain a good penetration property similarly to a single stranded cord. As a result, these techniques have been limited to specific use such as a racing tire, and it has been difficult to apply them to more common high performance radial tire intended for the application to a high performance passenger car.

The Patent Document 7 to 9 make a proposition to use a 1×n steel cord employing five or less small-diameter filaments as a belt layer. However, since such a cord is low in strength per cord, there arises a problem of high-speed durability when the cord is used as a belt reinforcing material for a high performance radial tire. Moreover, steel cords having a 1×n structure composed of six or more steel filaments stranded in the same direction at the same stranding pitch, are set forth in Patent Documents 10, 11, and the like. However, these documents do not disclose a technique for improving steering stability by using this cord as a belt reinforcing material for a high performance radial tire.

With this being the situation, a first object of the present invention is to provide a steel cord for reinforcing rubber article, superior in durability to conventional steel cords by improving on the cord structure, and to provide a pneumatic radial tire improved in steering stability and durability by using the same.

As a result of study by the present inventor, it has been founded that the steel code exhibits higher flexural rigidity in a state of being applied to a tire as a belt reinforcing cord than in a state of being the cord alone. That is, it has been proved that a flexural rigidity reducing effect of using fine filaments has not been sufficiently exerted in the tire, and that there is room for improvement.

Accordingly, a second object of the present invention is to solve the above-described problems associated with the conventional arts, and to provide a pneumatic radial tire satisfactorily combining steering stability, durability, and good cost performance required for a high performance radial tire intended for the application to a high performance passenger car.

Means for Solving the Problems

As a result of keen study by the present inventor, it has been found that a use of the following construction allows the above-described first object to be attained, and thus the inventor has achieved the present invention.

That is, a steel cord for reinforcing rubber article according to the present invention has a 1×n structure composed of a plurality of steel filaments stranded in the same direction at the same stranding pitch, the steel cord being characterized in that the number of steel filaments is 6 to 12, and the diameter of the steel filaments is 0.08 to 0.21 mm.

The cord according to the present invention preferably has flexural rigidity of 49 to 196 MPa (5.0 to 20.0 kgf/mm$^2$). In the present invention, preferably, the number of the steel filaments is 7 to 10, the diameter thereof is 0.10 to 0.20 mm, and the tensile strength thereof is 3200 to 4000 MPa. Also, in the present invention, especially, it is preferable that the outer profile shape of the cord is flat, and that the ratio (D1/D2) of the minor axis D1 of the outer profile shape to the major axis D2 thereof is 0.5 to 0.8.

A first pneumatic radial tire according to the present invention has a carcass, as a framework, extending toroidally between a pair of bead parts, with a crown part of the carcass being reinforced with a belt layer, the first pneumatic radial tire being characterized in that the steel cord for reinforcing rubber article according to the present invention is applied to a cord constituting the belt layer.

In the first tire according to the present invention, the flexural rigidity (Ec) of the steel cord for reinforcing rubber article that has been taken out from the belt layer with rubber attached thereto, is preferably 49 to 196 MPa (5.0 to 20.0 kgf/mm$^2$). Also, the flexural rigidity (Ec) of the steel cord for reinforcing rubber article that has been taken out from the belt layer with rubber attached thereto, is 1.0 to 1.27 times as high as the flexural rigidity (Er) of the steel cord for reinforcing rubber article, cleared of the rubber. Furthermore, more preferably, a steel cord for reinforcing rubber article wherein the outer profile shape of the cord is flat, and the ratio (D1/D2) of the minor axis D1 of the outer profile shape to the major axis D2 thereof is 0.5 to 0.8, is applied to the cord constituting the belt layer, and the steel cord is arranged so that the major axis direction of the cord outer profile shape is along the width direction of the belt layer.

The present inventor has analyzed a phenomenon that, when a multi-stranded steel code using conventional small-diameter filaments is applied to a tire as a belt reinforcing cord, this multi-stranded steel code exhibits larger rigidity than that of the code alone, and the present inventor has found the following matter.

When a bending deformation is applied to a steel code, relative movements occur between steel filaments, and between adjacent filaments in contact with one another, there arise interactions hampering these relative movements. When a pneumatic radial tire having a belt layer reinforced by a steel cord is produced, especially when it is expanded during vulcanization, a tension is applied to the steel cord, and hence, inside the completed tire, the steel cord enters a state of being subjected to a preliminary tension. When a tension is applied to the steel cord composed of a plurality of filaments, distances between filaments are reduced, and pressures between filaments in contact with one another are enhanced. As a result, in a state wherein the cord is buried in the tire, the interactions between filaments occurring when the cord is bent increase, and the cord becomes larger in the flexural rigidity than in a state of being the code alone (with zero tension). In particular, in the conventional multi-stranded steel cord using small-diameter filaments, when bending is applied, since interactions between strands occur in addition to those between the filaments, the increase in flexural rigidity is promoted.

From the above-described viewpoint, the present inventor has further conducted a keen study, and has found that a use of the following construction allows a tire combining a desired steering stability, durability, and good cost performance to be realized, and enables the second object of the present invention to be attained. Thus, the inventor has achieved a second pneumatic radial tire.

That is, the second pneumatic radial tire according to the present invention includes a carcass, as a framework, extending toroidally between a pair of bead parts, and at least one belt layer that is obtained by rubberizing a steel cord composed of a plurality of steel filaments and that is disposed on the outside in the radial direction of a crown part of the carcass, the second pneumatic radial tire being characterized in that the flexural rigidity (Ec) of the steel cord in a state of being buried in the belt layer is not less than 49 MPa nor more than 196 MPa, and simultaneously, the Ec value is 1.0 to 1.27 times as high as the flexural rigidity (Er) of the steel cord alone in a state of not being buried in the belt layer.

In the second pneumatic radial tire according to the present invention, the filament diameter of the steel filaments is preferably 0.08 to 0.21 mm, and the number of the steel filaments is preferably 6 to 12. Also, in the present invention, preferably, the steel cord is composed of the plurality of steel filaments stranded in the same direction at the same stranding pitch, and is buried in the belt layer, with rubber permeated between the steel filaments. In this case, especially, the steel cord has not a cord structure in which one or more of the steel filaments are encircled by the other steel filaments. Furthermore, preferably, the steel cord comprises a core strand composed of one or two of the steel filaments, and a layer of sheath composed of the other steel filaments stranded around the core strand. In this case, especially, the core strand is composed of two of the non-stranded steel filaments arranged in parallel to each other.

Advantages

According to the present invention, a steel cord for reinforcing rubber article that is superior in durability to conventional steel cords can be realized, and the use of it has enabled the implementation of a pneumatic radial tire improved in steering stability and durability. That is, in order to realize the preferred belt layer properties as described above, conventionally, multi-stranded steel cords using small-diameter filaments have been employed. However, since the cord according to the present invention has a 1×n structure composed of a plurality of steel filaments stranded in the same direction at the same stranding pitch, it has advantages of being high in productivity and being capable of production at low cost. Besides, by adopting an open structure or the like, good rubber penetration property can be provided. When further promotion of rubber penetration is asked for, techniques disclosed in the Patent Document 10 and 11 or the like can also be adopted.

Furthermore, according to the present invention, the use of the above-described construction has made it possible to realize a pneumatic radial tire satisfactorily combining steering stability, durability, and good cost performance required for a high performance radial tire intended for the application to a high performance passenger car.

Figure 1:
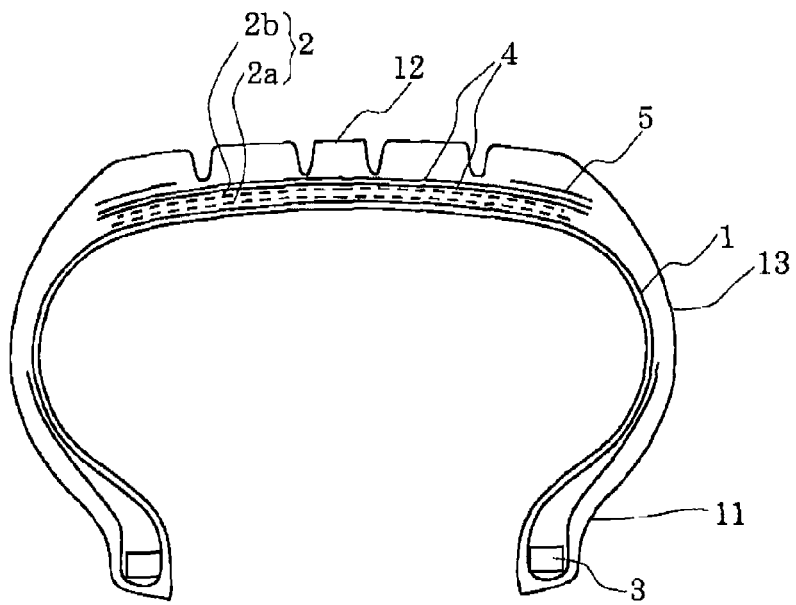
FIG. 1 is a schematic sectional view of a pneumatic radial tire according to an embodiment of the present invention.

| Reference Numerals | |
|---|---|
| 1 | carcass |
| 2 (2a and 2b) | crossed belt layers |
| 3 | bead core |
| 4 | cap layer |
| 5 | layer |
| 11 | bead part |
| 12 | tread part |
| 13 | side wall part |

BEST MODES FOR CARRYING OUT THE INVENTION

Hereinafter, preferred embodiments according to the present invention will be described in detail.

First, a steel cord for reinforcing rubber article according to the present invention is explained.

The steel cord for reinforcing rubber article in the present invention has a 1×n structure composed of a plurality of steel filaments stranded in the same direction at the same stranding pitch.

In the steel cord of the present invention, the diameter of filaments constituting the cord is 0.08 to 0.21 mm, preferably 0.10 to 0.20 mm. A steel filament having a diameter over 0.21 mm is too high in flexural rigidity, and hence, when it is used as a belt reinforcing material for a high performance radial tire, it is difficult to ensure sufficiently low out-of-plane rigidity. Therefore, the filament diameter is set to be 0.21 mm or less, preferably 0.20 mm or less. The flexural rigidity (flexing resistance) of the steel cord is preferably 49 to 196 MPa (5.0 to 20.0 kgf/mm$^2$).

On the other hand, if the diameter of the steel filament is under 0.08 mm, since the cord tenacity is too low under the condition of the filament number of 6 to 12, it is necessary to significantly increase the number of embedded cords in order to ensure circumferential rigidity for the belt layer. As a result, a separation between rubber and the cord becomes prone to occur. Otherwise, there arises a risk that high-speed durability may be impaired due to a diameter growth during high-speed running. Therefore, the filament diameter is set to 0.08 mm or more, preferably 0.10 mm or more.

In the steel cord in the present invention, the number of steel filaments constituting the cord is 6 to 12, preferably 7 to 10. When a bending deformation is applied to the code, relative movements occur between steel filaments, and between adjacent filaments in contact with each other, there arise interactions hampering the relative movements. Since the interactions are prone to be larger as the number of filaments increases, an upper limit of the number of filaments is set to 12, preferably 10. On the other hand, if the filament number is under 6, since the cord tenacity is too low under the condition of the filament diameter of 0.08 to 0.21 mm, it is necessary to significantly increase the number of embedded belt cords to thereby densely arrange cords in order to ensure the circumferential rigidity for the belt layer. As a result, a separation between rubber and the cord becomes prone to occur. Otherwise, there is a risk that high-speed durability may be impaired due to a diameter growth during high-speed running. Therefore, the number of filaments is set to 6 or more, preferably 7 or more.

Here, the brass-plated steel wire used as a filament for steel cord, having a diameter on the order of 0.08 to 0.21 mm, ordinarily has a tensile strength value around 3000 MPa. However, in the present invention, a use of filaments having a tensile strength of preferably 3200 to 4000 MPa, and more preferably 3300 to 4000 MPa facilitates ensuring the circumferential rigidity for the belt layer at a proper density of embedded belt cords.

Moreover, in the steel cord of the present invention, preferably, the outer profile shape of the cord is made flat so that the ratio (D1/D2) of the minor axis D1 of the outer profile shape to the major axis D2 thereof is 0.5 to 0.8. As a result, when this cord is applied to the tire, by arranging it so that the major axis direction of the cord outer profile shape is along the width direction of the belt layer, it is possible to make higher the in-plane flexural rigidity of the belt layer and make lower the out-of-plane flexural rigidity.

In the steel cord of the present invention, as described above, although the diameter and the number of steel filaments constituting the cord are defined in the cord having the 1×n structure, the other matters are not particularly limited but can be appropriately determined by the common procedure. For example, the stranding pitch of the cord may be on the order of 5.0 to 15.0 mm. The cord according to the present invention can be suitably applied for reinforcing various rubber articles such as tires, industrial belts, and especially can be suitably applied to high performance pneumatic radial tires.

Next, the first pneumatic radial tire according to the present invention will be described.

FIG. 1 shows a construction example of pneumatic radial tire according to the present invention. As illustrated, the first pneumatic radial tire in the present invention has a carcass 1 as a framework, extending toroidally between a pair of bead parts 11, with a crown part of the carcass being reinforced with a belt layer 2, wherein the above-described steel cord for reinforcing rubber article is applied to a cord constituting such a belt layer 2. As a result, it is possible to reduce the out-of-plane flexural rigidity while sufficiently ensuring the tensile rigidity in the circumferential direction and the in-plane flexural rigidity. This allows a good steering stability to be exerted while ensuring high-speed durability.

When a pneumatic radial tire having a belt layer reinforced by a steel cord is produced, especially when it is expanded during vulcanization, the steel cord is subjected to a tension, so that distances between filaments are reduced. As a consequence, in the cord in the tire, interactions hampering the relative movements between filaments when a bending deformation is applied, are generally larger than those in the code before being buried in the tire. In the first tire according to the present invention, the flexural rigidity of the steel cord in a state of being actually buried in the belt layer is preferably in a range of 49 to 196 MPa (5.0 to 20.0 kgf/mm$^2$). The flexural rigidity of this steel cord in a state of being actually buried in the belt layer can be evaluated by measuring the flexural rigidity (Ec) of the cord taken out from the belt layer with rubber attached thereto.

Moreover, it is preferable that the change in flexural rigidity of the cord before and after the cord being buried in the belt layer is small. Specifically, the flexural rigidity (Ec) of the cord that has been taken out from the belt layer with rubber attached thereto, is preferably 1.0 to 1.27 times as high as the flexural rigidity (Er) of the cord cleared of the rubber.

The flexural rigidity of the cord in the present invention is a value obtained by measuring in a state wherein the cord has been bent 15 degrees from a fulcrum after having been cut to a predetermined length, using a commercial taber flexural rigidity tester (for example, a Toyo Seiki Seisaku-sho, Ltd., digital taber type stiffness tester). Here, the flexural rigidity of the cord having a flat outer profile shape is defined to be rigidity (resistance) with respect to bending in the minor axis direction. Also, the flexural rigidity of the steel cord that has been taken out from the belt layer of the tire with rubber attached thereto, is measured in a state wherein, after the cord with the rubber attached thereto has been taken out, the thickness of a coating rubber on the cord surface is reduced to about 0.1 to 0.5 mm by chipping away the coating rubber. The flexural rigidity of the cord cleared of the rubber is measured in a state wherein the rubber is completely removed by an organic solvent or the like.

Since the number of filaments in the cord of the present invention is as small as 6 to 12, preferably 7 to 10, the interactions between filaments are small. Preferably, by using the following constructions, the change in flexural rigidity of the cord before and after the code being buried in the belt layer can be made small. (1) As a cord structure, to adopt an open structure or the like in which rubber is prone to penetrate between filaments. On the promotion of rubber penetration, besides the arts disclosed in the Patent Documents 10 and 11, arts disclosed in the following Patent Documents may be adopted: Japanese Unexamined Patent Application Publication No. 5-302283, Japanese Unexamined Patent Application Publication No. 6-10281, Japanese Unexamined Patent Application Publication No. 6-73673, Japanese Unexamined Patent Application Publication No. 7-279067, Japanese Unexamined Patent Application Publication No. 7-331587, Japanese Unexamined Patent Application Publication No. 8-92884, Japanese Unexamined Patent Application Publication No. 8-113886, Japanese Unexamined Patent Application Publication No. 9-209283, Japanese Unexamined Patent Application Publication No. 9-268485, Japanese Unexamined Patent Application Publication No. 10-250310, Japanese Unexamined Patent Application Publication No. 10-292277, Japanese Unexamined Patent Application Publication No. 10-298880, Japanese Unexamined Patent Application Publication No. 11-335985, Japanese Unexamined Patent Application Publication No. 11-350367, and the like. Interposing rubber between filaments makes the interactions smaller than the case where filaments make direct contact between them. (2) Regarding cord section, to use a single layer structure without a central structure into which rubber is less prone to penetrate (i.e., a structure in which one or more filaments are encircled by the other filaments). By doing this, the interposition of rubber between filaments reliably becomes prone to be realized, and also the number of adjacent filaments becomes as small as two in total on the both sides, i.e., a minimum number.

The first tire in the present invention has only to be one in which the above-described steel cord for reinforcing rubber article according to the present invention is applied to the belt layer, whereby effects of enhancing steering stability and durability can be obtained. The other matters such as a specific tire structure, a tire material and the like can be appropriately determined by the common procedure, and are not particularly limited.

Next, the second pneumatic radial tire according to the present invention will be described.

As shown in FIG. 1, the second pneumatic radial tire in the present invention includes a carcass 1 as a framework, extending toroidally between a pair of bead parts 11, and at least one belt layer (in the illustrated example, two crossing belt layers 2 [2a and 2b]) obtained by rubberizing a steel cord composed of a plurality of steel filaments, the belt layer being disposed on the outside in the radial direction of the crown part of the carcass 1.

In the second pneumatic radial tire of the present invention, by setting the flexural rigidity (Ec) of the steel cord in a state of being buried in the belt layer 2 to a value of not less than 49 MPa (5.0 kgf/mm$^2$) nor more than 196 MPa (20.0 kgf/mm$^2$), a steering stability sufficient for a high performance radial tire is ensured. Simultaneously, by defining the flexural rigidity (Ec) of the steel cord in a state of being buried in the belt layer 2 to be 1.0 to 1.27 times as high as the flexural rigidity (Er) of the steel cord alone in a state of not being buried in the belt layer 2, flexibility of the cord alone is effectively utilized in the tire.

As in the foregoing case, the flexural rigidity of the above-described steel cord can also be measured using a commercial taber flexural rigidity tester (for example, the Toyo Seiki Seisaku-sho, Ltd., digital taber type stiffness tester). Specifically, for example, the above-described flexural rigidity of the cord is a value obtained by measuring in a state wherein the cord has been bent 15 degrees from a fulcrum after having been cut to a predetermined length. In the case of a cord having a flat outer profile shape, the flexural rigidity value is defined to be rigidity with respect to bending in the minor axis direction. Also, the flexural rigidity of the steel cord that has been taken out from the belt layer 2 of the tire with rubber attached thereto, is measured in a state wherein, after the cord with the rubber attached thereto has been taken out, the thickness of a coating rubber on the cord surface is reduced to about 0.1 to 0.5 mm by chipping away the coating rubber. On the other hand, the flexural rigidity of the steel cord in a state of not being buried in the belt layer is measured in a state wherein rubber on the surface of the steel cord that has been taken out from the belt layer of the tire with the rubber attached thereto, is completely removed by an organic solvent. Alternatively, the flexural rigidity of the steel cord may be measured with respect to a raw cord before being buried in the tire.

In the second tire according to the present invention, if the flexural rigidity of the steel cord satisfies the above-described conditions, desired effects such as steering stability improving effect can be obtained. Although the code structure of the steel code is not particularly limited, as steel filaments constituting the steel code, for example, ones having a filament diameter of 0.08 to 0.21 mm, preferably 0.10 to 0.20 mm are used.

Setting the filament diameter of steel filaments to 0.21 mm or less, preferably 0.20 mm or less, facilitates making the flexural rigidity (Ec) of steel code in a state of being buried in the belt layer 2 to a value of 196 Pa or less. On the other hand, if the diameter of the steel filament is under 0.08 mm, since the cord tenacity is too low under the condition of a preferred filament number to be described later, it is necessary to significantly increase the number of embedded cords to thereby densely arrange cords in order to ensure the circumferential rigidity for the belt layer 2. As a result, a separation between rubber and the cord becomes prone to occur. Otherwise, there arises a risk that high-speed durability may be impaired because of shortage of circumferential rigidity.

The number of steel filaments constituting the steel cord is set to 6 to 12, preferably 7 to 10. Why the upper limit of the filament number is set to 12, preferably 10 is because interactions between filaments when the cord is bent, are prone to be larger as the filament number increases. On the other hand, if the filament number is under 6, since the cord tenacity is too low under the condition of the above-described preferred filament diameter, it is necessary to significantly increase the number of embedded cords to thereby densely arrange cords in order to ensure the circumferential rigidity for the belt layer 2. As a result, a separation between rubber and the cord becomes prone to occur. Otherwise, there arises a risk that high-speed durability may be impaired because of shortage of circumferential rigidity.

In the second tire according to the present invention, it is preferable to use the steel cord having a 1×n structure composed of all steel filaments stranded in the same direction at the same stranding pitch, in a state of being buried in the belt layer 2 with rubber permeated between the filaments. Since rubber is interposed between the filaments, by burying the steel cord with rubber permeated between filaments, interactions between filaments when the cord is bent becomes smaller, as compared with the case where filaments directly makes contact with each other. In this 1×n single stranded structure, it is easy to provide a structure in which rubber is permeable into the code. For example, by applying an open structure in which excessively patterned filaments are loosely stranded, a structure in which filaments provided with ripple curls are stranded, or the like, rubber permeability can be imparted.

When the steel cord having such a 1×n structure is applied, more preferably, a cord structure without a core structure in which one or more steel filaments are encircled by the other steel filaments, is employed. As compared with the structure with a core structure, the cord structure without a core structure is small in the number of mutually adjacent filaments therein, and therefore, interactions between filaments when the cord is bent, are small. Besides, the cord structure without a core structure allows rubber permeation into the cord to be more perfect.

When a steel cord having n+m structure composed of sheath filaments stranded around a core strand is applied, the filament number (n) of the core strand is set to 1 or 2, and the number of sheath layer is set to 1. If the filament number (n) of the core strand is 3 or more, in the center of the cord, a closed space into which rubber does not permeate by being encircled by the core filaments, is prone to occur. Also, if the number of sheath layers is 2 or more, it is difficult to cause rubber to permeate into an inside sheath. In this case, more preferably, the number of sheath filaments (m) is set to 5 to 8, thereby providing a structure in which spacings are provided between sheath filaments.

When a steel cord having such a n+m structure is applied, more preferably, the core strand is composed of non-stranded two filaments arranged in parallel to each other. In this case, since the core filaments are not stranded, an interaction between core filaments when the cord is bent, is smaller.

A preferred stranding pitch in the second tire according to the present invention is on the order of 5 to 18 mm. If the stranding pitch is under 5 mm, there is a risk of causing breaking of filaments during stranding, and productivity decreases, resulting in cost increase. Conversely, if the stranding pitch is over 18 mm, the stranding angle decreases, so that stranding property incurs a risk of being deteriorated. In addition, there is a drawback of becoming less prone to rubber penetration.

In the second tire of the present invention, preferably, the outer profile shape of the steel cord is made flat, and the steel cord is arranged so that the major axis direction of the flat section is along the width direction of the belt layer. By doing this, the flexural rigidity has anisotropy, so that it is possible to construct a belt layer that is higher in in-plane flexural rigidity and lower in out-of-plane flexural rigidity, as compared with the case where non-flat steel cord is arranged.

As steel filaments used for the steel cord, brass-plated steel wires ordinarily having a tensile strength on the order of 3200 to 4000 MPa, especially 3300 to 4000 MPa can be suitably employed. As a result, within the above-described range of the preferred filament diameter and the preferred filament number, the circumferential flexural rigidity for the belt layer can be easily ensured at a proper density of embedded belt cords.

In the second tire of the present invention, by appropriately adjusting conditions regarding the above-described steel filaments and cord structure, a steel cord satisfying the above-described conditions can be obtained, and by applying such a steel cord to the belt layer 2, a pneumatic radial tire superior in steering stability and durability can be realized. Here, structures, specific materials, and the like of the other members constituting the tire are not particularly restricted.

In either of the first and second tires according to the present invention, for example, as illustrated, a bead core 3 is buried in each of the pair of bead parts 11, and the carcass 1 is folded from the inside of the tire to the outside thereof around the bead cores 3, and engaged therewith. A tread part 12 is arranged on the outer periphery of the crown part of the belt layer 2, and sidewall parts 13 are arranged on the side portions of the carcass 1, respectively. For the purpose of increasing the circumferential flexural rigidity, on the outer periphery of the crown part of the crossed belt layers 2a and 2b, cap layers 4 (in the illustrate example, two layers), and a pair of layers 5 can be arranged. Here, the cap layers 4 each have a widthwise length covering at least the belt layer 2, and are each composed of rubberized reinforcing cords arranged substantially in parallel to the tire circumferential direction. The pair of layer tiers 5 each have a widthwise length covering a widthwise end portion on one side of the belt layer, and are each composed of rubberized reinforcing cords arranged substantially in parallel to the tire circumferential direction.

EMBODIMENTS

Hereinafter, the present invention will be explained in more detail using embodiments.

Conventional Examples 1, Embodiments 1, Comparative Examples 1

In accordance with conditions shown in the following Table 1 and Table 2, steel cords for reinforcing rubber article were produced, and a pneumatic radial tire with a tire size of 225/45/R17 was produced by applying the obtained cord to the belt layer of the tire (refer to FIG. 1). As illustrated, the belt structure comprises two layers of crossed steel belt layers 2a and 2b (angle: ±60°), the two cap layers 4, and the pair of layers 5 (material: nylon), wherein the cap layers 4 and the pair of layers 5 are composed of reinforcing cords arranged substantially in parallel to the tire circumferential direction.

(Rubber Permeability Evaluation)

Each test cord was covered with rubber and vulcanized. Then, one end of the test cord was soaked in an aqueous 10 percent solution of NaOH, and after the test cord has been left for 24 hours, "rubber separation length" was measured. If the rubber has permeated the cord up to the inside thereof, the rubber is not separated. Herein, if the separation length is on the order of 10 mm or less, no practical problems occur.

(Steering Stability Evaluation)

Each set of test tires were mounted onto four wheels of a passenger car, with an air pressure of 205.8 kPa (2.1 kgf/cm$^2$) charged, and a test driver run this test car on a test course. The steering stability was evaluated by rating result of feeling of the test driver in comparison with the case of a control tire (conventional example 1-1). The reference points for the evaluation are as follows:

+3: good
+2: rather good
+1: seems to be rather good
±0: unchanged
−1: seems to be rather bad
−2: rather bad
−3: bad (High-Speed Durability Evaluation)

Each set of test tires were mounted onto rims having a rim size of 7.5 J×17, with an air pressure of 300 kPa charged, and the high-speed durability evaluation was performed by the step speed method in conformance with a test method according to JATMA standards. The evaluation result is shown by an index, with the speed at tire failure in the conventional example 1-1 as 100. Higher the numeral value, better is the result.

(Corrosion Durability Evaluation)

After each set of test tires had been mounted onto standard rims defined by the JATMA standards, an internal pressure corresponding to the maximum load-carrying capacity in JATMA YEAR BOOK was charged into the test tires, and the tires were mounted onto a passenger car. After the car had run on a paved road for 50,000 km, the test tire was destructed, and a corrosion length of the code was examined from a cut. The evaluation result is shown by an index, with the corrosion length of the test tire in the conventional example 1-1 as 100. Lower the numeral value, better is the result.

The above-described measured results are collectively shown in the following tables 1 and table 2. In these tables, flexural rigidity of each of the test cords was measured by using the taber flexural rigidity tester (the Toyo Seiki Seisakusho, Ltd., digital taber type stiffness tester), in a state wherein the code was bent 15 degrees from a fulcrum after having been cut to a length of 90 to 95 mm. The flexural rigidity of a code of which the outer profile shape is flat was defined to be rigidity with respect to bending in the minor axis direction. Also, the flexural rigidity ($E_c$) of the steel cord that had been taken out from the belt layer of the tire with rubber attached thereto, was measured in a state wherein, after the cord with the rubber attached thereto had been taken out, the thickness of a coating rubber on the cord surface was reduced to about 0.1 to 0.5 mm by chipping away the coating rubber. The flexural rigidity (Er) of the cord cleared of the rubber was measured in a state wherein the rubber is completely removed by an organic solvent.

(Measurements of Flexural Rigidity Ec and Er)

The measurements were made by using the digital taber rigidity tester manufactured by Toyo Seiki Seisaku-sho, Ltd.,

TABLE 1

Figure 2:
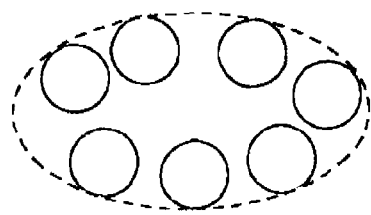
FIG. 2 is a schematic sectional view of a steel cord for reinforcing rubber article according to an embodiment 1-1 or 2-1 of the present invention.
Figure 3:
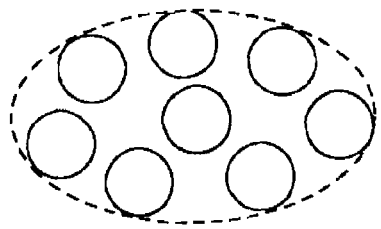
FIG. 3 is a schematic sectional view of a steel cord for reinforcing rubber article according to an embodiment 1-2 or 2-2 of the present invention.
Figure 9:
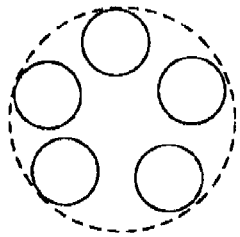
FIG. 9 is a sectional view of a steel cord for reinforcing rubber article according to a conventional example 1-1 or 2-1.
Figure 10:
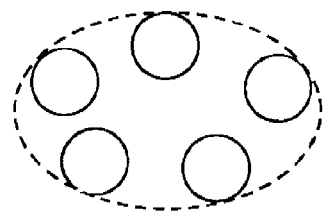
FIG. 10 is a sectional view of a steel cord for reinforcing rubber article according to a conventional example 1-2.
Figure 11:
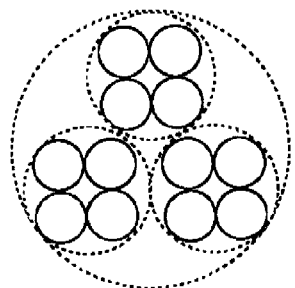
FIG. 11 is a sectional view of a steel cord for reinforcing rubber article according to a conventional example 1-3 or 2-2.

|  | Conventional example 1-1 | Conventional example 1-2 | Conventional example 1-3 | Embodiment 1-1 | Embodiment 1-2 |
|---|---|---|---|---|---|
| Cord structure | 1 × 5 × 0.225 | 1 × 5 × 0.18 | 3 × 4 × 0.15 | 1 × 7 × 0.19 | 1 × 8 × 0.175 |
| Stranding pitch (mm) | 9.5 | 9.5 | 9.5/9.5 | 11.0 | 11.0 |
| Stranding direction | S | S | S/S | S | S |
| Figure corresponding to cord section | FIG. 9 | FIG. 10 | FIG. 11 | FIG. 2 | FIG. 3 |
| Ellipticity D1/D2 *[1] | 1.0 | 0.80 | 1.0 | 0.78 | 0.75 |
| Filament tensile strength (MPa) | 3204 | 3626 | 2976 | 3363 | 3571 |
| Cord tenacity (N) | 637 | 47.0 | 579 | 647 | 666 |
| Number of embedded cords per 50 mm | 36 | 47.3 | 37.88 | 37 | 40.65 |
| Flexural rigidity         Ec | 314.7 | 147 | 232.3 | 195.6 | 194.7 |
| (MPa)                     Er | 307.0 | 144.7 | 177.9 | 187.3 | 180.5 |
| Ec/Er | 1.02 | 1.01 | 1.31 | 1.04 | 1.08 |
| Rubber permeability (mm) | 5.1 | 4.7 | 8.5 | 4.5 | 5.0 |
| Steering stability (rating) | Reference | +1 | +1 | +2 | +3 |
| High-speed durability (index) | 100 | 85 | 100 | 110 | 120 |
| Corrosion durability (index) | 100 | 100 | 95 | 100 | 100 |

*[1]Ellipticity D1/D2 (D1 and D2, respectively, indicate the minor axis and the major axis of an elliptic section)

TABLE 2

Figure 4:
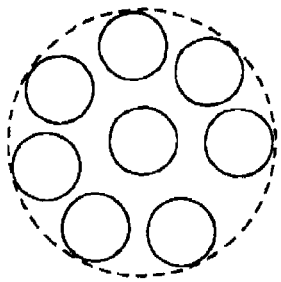
FIG. 4 is a schematic sectional view of a steel cord for reinforcing rubber article according to an embodiment 1-3 of the present invention.
Figure 5:
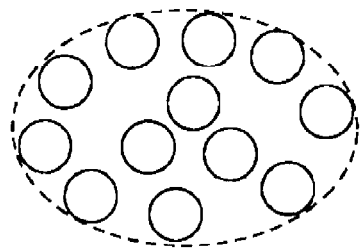
FIG. 5 is a schematic sectional view of a steel cord for reinforcing rubber article according to an embodiment 1-4 of the present invention.
Figure 12:
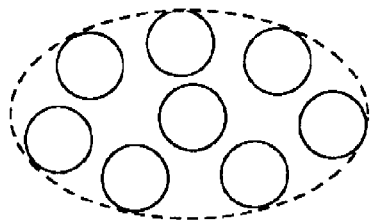
FIG. 12 is a sectional view of a steel cord for reinforcing rubber article according to a comparative example 1-1.
Figure 13:
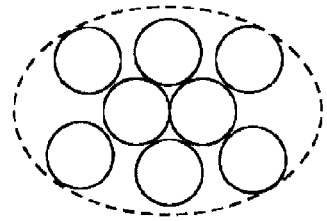
FIG. 13 is a sectional view of a steel cord for reinforcing rubber article according to a comparative example 1-2 or 2-2.

|  | Embodiment 1-3 | Embodiment 1-4 | Comparative example 1-1 | Comparative example 1-2 |
|---|---|---|---|---|
| Cord structure | 1 × 8 × 0.175 | 1 × 12 × 0.15 | 1 × 8 × 0.22 | 2 + 6 × 0.175 |
| Stranding pitch (mm) | 11.0 | 11.0 | 11.0 | —/11.0 |
| Stranding direction | S | S | S | —/S |
| Figure corresponding to cord section | FIG. 4 | FIG. 5 | FIG. 12 | FIG. 13 |
| Ellipticity D1/D2 | 1.0 | 0.69 | 0.75 | 0.81 |
| Filament tensile strength (MPa) | 3571 | 3271 | 3217 | 3571 |
| Cord tenacity (N) | 667 | 693 | 979 | 658 |
| Number of embedded cords per 50 mm | 40.65 | 40.65 | 30.1 | 40.65 |
| Flexural rigidity         Ec | 194.0 | 182.7 | 335.2 | 248.5 |
| (MPa)                     Er | 185.0 | 172.6 | 300.1 | 204.4 |
| Ec/Er | 1.05 | 1.06 | 1.12 | 1.21 |
| Rubber permeability (mm) | 5.2 | 7.7 | 5.7 | 7.2 |
| Steering stability (rating) | +2 | +3 | 0 | −1 |
| High-speed durability (index) | 120 | 115 | 115 | 105 |
| Corrosion durability (index) | 100 | 95 | 100 | 90 |

As shown in the above-described Tables 1 and 2, the tires according to the embodiments each having a 1×n structure composed of 6 to 12 steel filaments stranded in the same direction at the same stranding pitch, with the diameter of the filaments being 0.08 to 0.21 mm, were ascertained to be superior in both steering stability and durability to the tires of the conventional examples and the comparative examples, which do not satisfy the above-described conditions.

Conventional Examples 2, Embodiments 2, Comparative Examples 2

As shown in FIG. 1, a pneumatic radial tire was produced in which two layers of crossed steel belt layers 2a and 2b each composed of rubberized steel cords, two cap layers 4, and a pair of layers 5 are arranged in this order from below in the radial direction of the crown part of the carcass. As the steel cords, ones satisfying the conditions in the following tables 3 and 4 were employed. The tire size was set to 225/45R17, and the angle of the crossed belts 2a and 2b was set to ±60° with respect to the width direction of the tire. Nylon cords were applied to the cap layer 4 and the layer tiers 5. Evaluation was made regarding each test tire obtained in accordance with the following methods. Evaluation results are collectively shown in Tables 3 and 4.

in a state wherein the code was bent 15 degrees from a fulcrum after having been cut to a predetermined length. The flexural rigidity of a code of which the outer profile shape is flat was defined to be rigidity with respect to bending in the minor axis direction. Also, the flexural rigidity (Ec) of the steel cord in a state of being buried in the belt layer, was measured in a state wherein, after the cord with the rubber attached thereto cut off from the test tire, the thickness of a coating rubber on the cord surface was reduced to about 0.1 to 0.5 mm by chipping away the coating rubber. The flexural rigidity (Er) of the cord alone in a state of not being buried in the belt layer was measured in a state wherein the rubber on the cord surface with rubber attached thereto, cut off from the test tire, was completely removed by dissolution with an organic solvent.

(Rubber Permeability Evaluation)

The rubber permeability of each steel cord was evaluated by soaking it in an aqueous 10 percent solution of NaOH, and after 24 hours, the rubber permeability of each of the steel cords was evaluated by checking to see the degree of corrosion by NaOH. In the case of a common rubber penetration property, corrosion amount becomes 0 (conventional example 2-1), and this is shown by an index of 100. Higher the index, better the result.

(Steering Stability Evaluation)

Each set of test tires was mounted onto four wheels of a passenger car, with an air pressure of 205.8 kPa (2.1 kgf/cm$^2$) charged, and a test driver run this test car on a test course. The steering stability and riding comfort was evaluated by the rating result of feeling of the test driver in accordance with the following criteria, in comparison with the case of a control tire (conventional example 2-1).

+3: good
+2: rather good
+1: seems to be rather good
±0: unchanged
−1: seems to be rather bad
−2: rather bad
−1: bad (High-Speed Durability Evaluation)

Each set of test tires was mounted onto rims having a rim size of 7.5 J×17, with an air pressure of 300 kPa charged, and the high-speed durability evaluation was performed by the step speed method in conformance with a test method according to the JATMA standards. The evaluation result is shown by an index, with speed at tire failure in the conventional example 2-1 as 100. Higher the numeral value, better is the result.

(Corrosion Durability Evaluation)

After each set of test tires had been mounted onto standard rims defined by the JATMA standards, an internal pressure corresponding to the maximum load-carrying capacity in JATMA YEAR BOOK was charged into the tires, and the tires were mounted to a passenger car. After the car had run on a paved road for 50,000 km, the tire was destructed, and a corrosion length of the code was examined from the cut. The evaluation result is shown by an index, with corrosion length in the conventional example 2-1 as 100. Lower the numeral value, smaller is the corrosion length, that is, better is the result.

TABLE 3

|  | Conventional example 2-1 | Conventional example 2-2 | Embodiment 2-1 | Embodiment 2-2 |
|---|---|---|---|---|
| Cord structure | 1 × 5 × 0.225 | 3 × 4 × 0.15 | 1 × 7 × 0.19 | 1 × 8 × 0.175 |
| Stranding pitch (mm) | 9.5 | 5.5/5.5 | 9.5 | 11.0 |
| Figure corresponding to cord section | FIG. 9 | FIG. 11 | FIG. 2 | FIG. 3 |
| Ellipticity D1/D2 *1 | 1.0 | 1.0 | 0.78 | 0.75 |
| Filament tensile strength (MPa) | 3204 | 2976 | 3363 | 3571 |
| Cord tenacity (N) | 637 | 579 | 647 | 666 |
| Number of embedded cords per 50 mm | 36 | 37.88 | 37 | 37.2 |
| Ec (MPa) | 314.7 | 177.9 | 195.6 | 194.7 |
| Er (MPa) | 307.0 | 232.3 | 187.3 | 180.5 |
| Ec/Er | 1.02 | 1.31 | 1.04 | 1.08 |
| Rubber permeability (index) | 100 | 85 | 100 | 100 |
| Steering stability (rating) | Reference | +1 | +2 | +3 |
| High-speed durability (index) | 100 | 100 | 110 | 110 |
| Corrosion durability (index) | 100 | 95 | 100 | 100 |

*1 Ellipticity D1/D2 (D1 AND D2, respectively, indicate the minor axis and the major axis of an elliptic section)

TABLE 4

Figure 6:
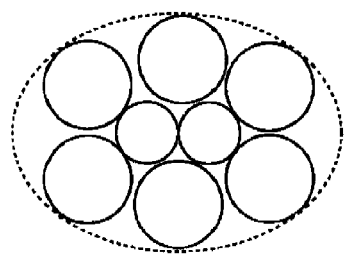
FIG. 6 is a schematic sectional view of a steel cord used in an embodiment 2-3 of the present invention.
Figure 7:
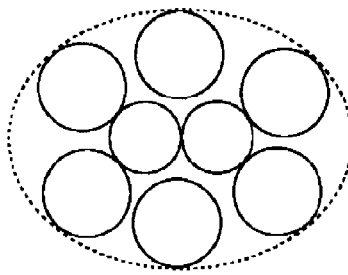
FIG. 7 is a schematic sectional view of a steel cord used in an embodiment 2-4 of the present invention.
Figure 8:
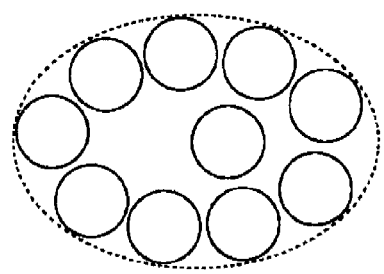
FIG. 8 is a schematic sectional view of a steel cord used in an embodiment 2-5 of the present invention.
Figure 14:
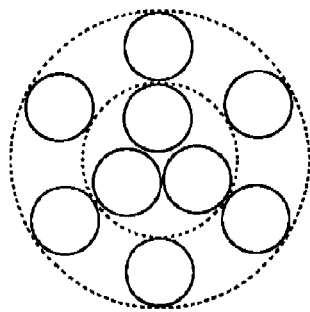
FIG. 14 is a sectional view of a steel cord used in a comparative example 2-1.

|  | Embodiment 2-3 | Embodiment 2-4 | Embodiment 2-5 | Comparative example 2-1 | Comparative example 2-2 |
|---|---|---|---|---|---|
| Cord structure | 2 × 0.12 + 6 × 0.17 | 2 × 0.15 + 6 × 0.175 | 1 × 10 × 0.12 | 3 + 6 × 0.175 | 2 + 6 × 0.175 |
| Stranding pitch (mm) | 12.0 | 11.0 | 10.5 | 12.0 | 11.0 |
| Figure corresponding to cord section | FIG. 6 | FIG. 7 | FIG. 8 | FIG. 14 | FIG. 13 |
| Ellipticity D1/D2 | 0.79 | 0.71 | 0.75 | 1.0 | 0.81 |
| Filament tensile strength (MPa) | 3571 | 3571 | 3822 | 3571 | 3571 |
| Cord tenacity (N) | 566 | 610 | 443 | 748 | 658 |
| Number of embedded cords per 50 mm | 42.2 | 40.65 | 63.7 | 37 | 37 |
| Ec(MPa) | 184.4 | 191.0 | 58.7 | 263.8 | 248.5 |
| Er(MPa) | 166.3 | 176.5 | 49.7 | 197.0 | 204.4 |
| Ec/Er | 1.11 | 1.08 | 1.18 | 1.34 | 1.21 |
| Rubber permeability (index) | 98 | 99 | 100 | 80 | 90 |
| Steering stability (rating) | +2 | +3 | +3 | ±0 | −1 |
| High-speed durability (index) | 107 | 112 | 108 | 100 | 105 |
| Corrosion durability (index) | 100 | 100 | 100 | 80 | 90 |

As shown in Tables 3 and 4, the tire in each of the embodiments using steel cords of which the flexural rigidity (Ec) in a state of being buried in the belt layer is not less than 49 MPa nor more than 196 MPa, and simultaneously, the Ec value is 1.0 to 1.27 times as high as the flexural rigidity (Er) of the steel cords alone in a state of not being buried in the belt layer, was ascertained to have superior steering stability and durability to the tire in each of the comparative examples, which does not satisfy the above-described conditions.

The invention claimed is:

1. A steel cord for reinforcing rubber article having a 1×n structure composed of a plurality of steel filaments stranded in the same direction at the same stranding pitch, the steel cord being characterized in that the number of the steel filaments is 6 to 12, and that the diameter of the steel filaments is 0.08 to 0.21 mm,
   wherein the outer profile shape of the cord is flat, and the ratio (D1/D2) of the minor axis D1 of the outer profile shape to the major axis D2 thereof is 0.5 to 0.8, and
   wherein the flexural rigidity of the steel cord is 49 to 196 MPa (5.0 to 20.0 kgf/mm$^2$).

2. The steel cord for reinforcing rubber article according to claim 1, wherein the number of the steel filaments is 7 to 12.

3. The steel cord for reinforcing rubber article according to claim 1, wherein the diameter of the steel filaments is 0.10 to 0.20 mm.

4. The steel cord for reinforcing rubber article according to claim 1, wherein the tensile strength of each of the steel filaments is 3200 to 4000 MPa.

5. A pneumatic radial tire having a carcass, as a framework, extending toroidally between a pair of bead parts, with a crown part of the carcass being reinforced with a belt layer, the pneumatic radial tire being characterized in that the steel cord for reinforcing rubber article according to claim 1 is applied to a cord constituting the belt layer.

6. The pneumatic radial tire according to claim 5, wherein the flexural rigidity (Ec) of the steel cord for reinforcing rubber article that has been taken out from the belt layer, with rubber attached thereto is 49 to 196 MPa (5.0 to 20.0 kgf/mm$^2$).

7. The pneumatic radial tire according to claim 5, wherein the flexural rigidity (Ec) of the steel cord for reinforcing rubber article that has been taken out from the belt layer, with rubber attached thereto is 1.0 to 1.27 times as high as the flexural rigidity (Er) of the steel cord for reinforcing rubber article with the rubber removed.

8. The pneumatic radial tire according to claim 5,
   wherein the steel cord is applied to the cord constituting the belt layer; and
   wherein the steel cord is arranged so that the major axis direction of the cord outer profile shape is along the width direction of the belt layer.

9. A pneumatic radial tire including a carcass, as a framework, extending toroidally between a pair of bead parts, and at least one belt layer that is obtained by rubberizing a steel cord composed of a plurality of steel filaments and that is disposed on the outside in the radial direction of a crown part of the carcass, the pneumatic radial tire being characterized in that the flexural rigidity (Ec) of the steel cord in a state of being buried in the belt layer is not less than 49 MPa nor more than 196 MPa, and that the Ec value is 1.0 to 1.27 times as high as the flexural rigidity (Er) of the steel cord alone in a state of not being buried in the belt layer,
   wherein the outer profile shape of the cord is flat, and the ratio (D1/D2) of the minor axis D1 of the outer profile shape to the major axis D2 thereof is 0.5 to 0.8.

10. The pneumatic radial tire according to claim 9, wherein the diameter of the steel filaments is 0.08 to 0.21 mm.

11. The pneumatic radial tire according to claim 9, wherein the number of steel filaments is 6 to 12.

12. The pneumatic radial tire according to claim 9, wherein the steel cord is composed of the plurality of steel filaments stranded in the same direction at the same stranding pitch, and is buried in the belt layer, with rubber permeated between the steel filaments.

13. The pneumatic radial tire according to claim 12, wherein the steel cord does not have a cord structure in which one or more said steel filaments are encircled by the other steel filaments.

14. The pneumatic radial tire according to claim 11, wherein the steel cord comprises a core strand composed of one or two said steel filaments, and a layer of sheath composed of the other steel filaments stranded around the core strand.

15. The pneumatic radial tire according to claim 14, wherein the core strand is composed of two non-stranded steel filaments arranged in parallel to each other.

* * * * *